United States Patent
Browne et al.

(10) Patent No.: US 7,628,116 B2
(45) Date of Patent: Dec. 8, 2009

(54) SHAPE MEMORY POLYMER TEMPERATURE SENSING DEVICES AND METHODS OF USE

(75) Inventors: Alan L. Browne, Grosse Pointe, MI (US); Nancy L. Johnson, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 604 days.

(21) Appl. No.: 11/075,383

(22) Filed: Mar. 8, 2005

(65) Prior Publication Data

US 2005/0199055 A1    Sep. 15, 2005

Related U.S. Application Data

(60) Provisional application No. 60/552,795, filed on Mar. 12, 2004.

(51) Int. Cl.
*G01K 1/02* (2006.01)
(52) U.S. Cl. .............. 116/216; 16/201; 374/52
(58) Field of Classification Search .......... 116/216, 116/221, 200, 201, 207, DIG. 10, DIG. 17; 374/195, 205, 52, 55, 155, 43, 182; 606/78, 606/219
See application file for complete search history.

(56) References Cited

U.S. PATENT DOCUMENTS

| | | | | |
|---|---|---|---|---|
| 2,966,261 A * | 12/1960 | Bradbury | .................... | 206/306 |
| 3,290,942 A * | 12/1966 | Carbaugh et. al. | .......... | 374/104 |
| 4,325,217 A * | 4/1982 | Golestaneh | ................. | 116/218 |
| 4,522,219 A * | 6/1985 | Ohkata | ........................ | 116/218 |
| 5,007,742 A * | 4/1991 | Usui et al. | .................. | 374/136 |
| 5,171,252 A * | 12/1992 | Friedland | .................... | 606/151 |
| 5,188,728 A * | 2/1993 | Traonvoez et al. | .......... | 116/267 |
| 5,335,994 A * | 8/1994 | Weynant nee Girones | .. | 116/216 |
| 5,455,549 A * | 10/1995 | Strickland et al. | ........... | 116/281 |
| 5,720,555 A * | 2/1998 | Elele | .......................... | 116/216 |
| 5,735,607 A * | 4/1998 | Shahinpoor et al. | ......... | 116/216 |
| 6,388,043 B1 * | 5/2002 | Langer et al. | ................. | 528/80 |
| 6,442,785 B1 * | 9/2002 | Robinson | ................... | 15/167.1 |
| 6,720,402 B2 | 4/2004 | Langer et al. | | |
| 6,848,390 B2 * | 2/2005 | Akers et al. | ................. | 116/216 |
| 6,872,433 B2 * | 3/2005 | Seward et al. | .............. | 428/36.9 |
| 7,032,282 B2 * | 4/2006 | Powell et al. | .............. | 29/426.4 |
| 2001/0042501 A1 * | 11/2001 | Park | .......................... | 116/216 |
| 2003/0103553 A1 * | 6/2003 | Shahinpoor | ................. | 116/216 |
| 2003/0188676 A1 * | 10/2003 | Petrakis | ...................... | 116/216 |
| 2005/0183656 A1 * | 8/2005 | Isaacson et al. | ............. | 116/216 |
| 2006/0260534 A1 * | 11/2006 | Petrakis | ...................... | 116/216 |

FOREIGN PATENT DOCUMENTS

GB    2120788 A  * 12/1983

\* cited by examiner

*Primary Examiner*—Amy Cohen Johnson

(57) ABSTRACT

A temperature sensing device includes two or more strips, wherein each of the two or more strips comprises a shape memory polymer adapted to undergo a change in a modulus of elasticity at a thermal transition temperature. A method comprises contacting two or more strips with an item, wherein each strip comprises a shape memory polymer adapted to undergo a change in a modulus of elasticity at a thermal transition temperature; equilibrating the two or more strips with the item; and determining a temperature range of the item by observing whether any of the two or more strips underwent a decrease in stiffness and/or increase in flexibility caused by the change in the modulus of elasticity of the shape memory polymer.

7 Claims, 2 Drawing Sheets

SHAPE MEMORY POLYMER TEMPERATURE SENSING DEVICES AND METHODS OF USE

CROSS REFERENCE TO RELATED APPLICATIONS

The present application relates to, and claims priority to, U.S. Provisional Patent Application No. 60/552,795, which was filed on Mar. 12, 2004 and is incorporated herein in its entirety.

BACKGROUND

The present disclosure generally relates to temperature sensing and, more particularly, to temperature sensing using a shape memory polymer.

Temperature sensing devices come in myriad forms, taking advantage of numerous underlying scientific principles. For example, mercury-, alcohol- or other liquid-containing bulb thermometers rely on the principle that the volume of a liquid is directly related to its temperature. Consequently, the volume of a liquid is actually measured and converted into a corresponding temperature. Similarly, an electronic thermometer really measures electrical resistance; and pyrometers remotely sense emitted radiation (e.g., infrared radiation). Finally, temperature strips measure the molecular structure and/or optical properties (i.e., color) of the liquid crystals from which they are formed.

Despite the variety, there are limitations in existing temperature sensing devices. For example, electronic thermometers and pyrometers, while highly portable, require a power source such as a battery, which is an added expense to what may already be an expensive device. Bulb thermometers, which are the most well-known and commonly used temperature sensing devices, are falling out of favor with some because they are prone to breaking, thereby leaking potentially toxic fluids into the environment. Thermochromic liquid crystal (TLC) temperature strips are desirable because of their portability, low cost, and convenience. However, many TLC temperature strips are irreversible or designed to be used only once and then discarded. While some TLC temperature strips are reversible (i.e., can be used more than once), they may suffer from less pronounced color changes with repeated use.

Therefore, despite their suitability for their intended purposes, there nonetheless remains a need in the art for improved temperature sensing devices. It would be particularly advantageous if these systems were reversible, relatively inexpensive to both manufacture and use, highly portable, and robust enough to withstand repeated use without degrading.

BRIEF SUMMARY

A temperature sensing device comprises two or more strips, wherein each of the two or more strips comprises a shape memory polymer adapted to undergo a change in a modulus of elasticity at a thermal transition temperature.

A fluid flow restrictor comprises a conduit and a temperature sensing device disposed in the conduit, wherein the temperature sensing device comprises two or more strips, wherein each of the two or more strips comprises a shape memory polymer adapted to undergo a change in a modulus of elasticity at a thermal transition temperature.

A stirrer comprises a shape memory polymer adapted to undergo a change in a modulus of elasticity at a thermal transition temperature, wherein the change in the modulus of elasticity of the shape memory polymer results in a change in stiffness and/or flexibility of the stirrer, and wherein the thermal transition temperature is attained by immersing or contacting the stirrer with a fluid.

A method comprises contacting two or more strips with an item, wherein each strip comprises a shape memory polymer adapted to undergo a change in a modulus of elasticity at a thermal transition temperature; equilibrating the two or more strips with the item; and determining a temperature range of the item by observing whether any of the two or more strips underwent a decrease in stiffness and/or increase in flexibility caused by the change in the modulus of elasticity of the shape memory polymer.

The above described and other features are exemplified by the following figures and detailed description.

BRIEF DESCRIPTION OF THE DRAWINGS

Referring now to the Figure, which is an exemplary embodiment and wherein like elements are numbered alike.

DETAILED DESCRIPTION

Figure 1:
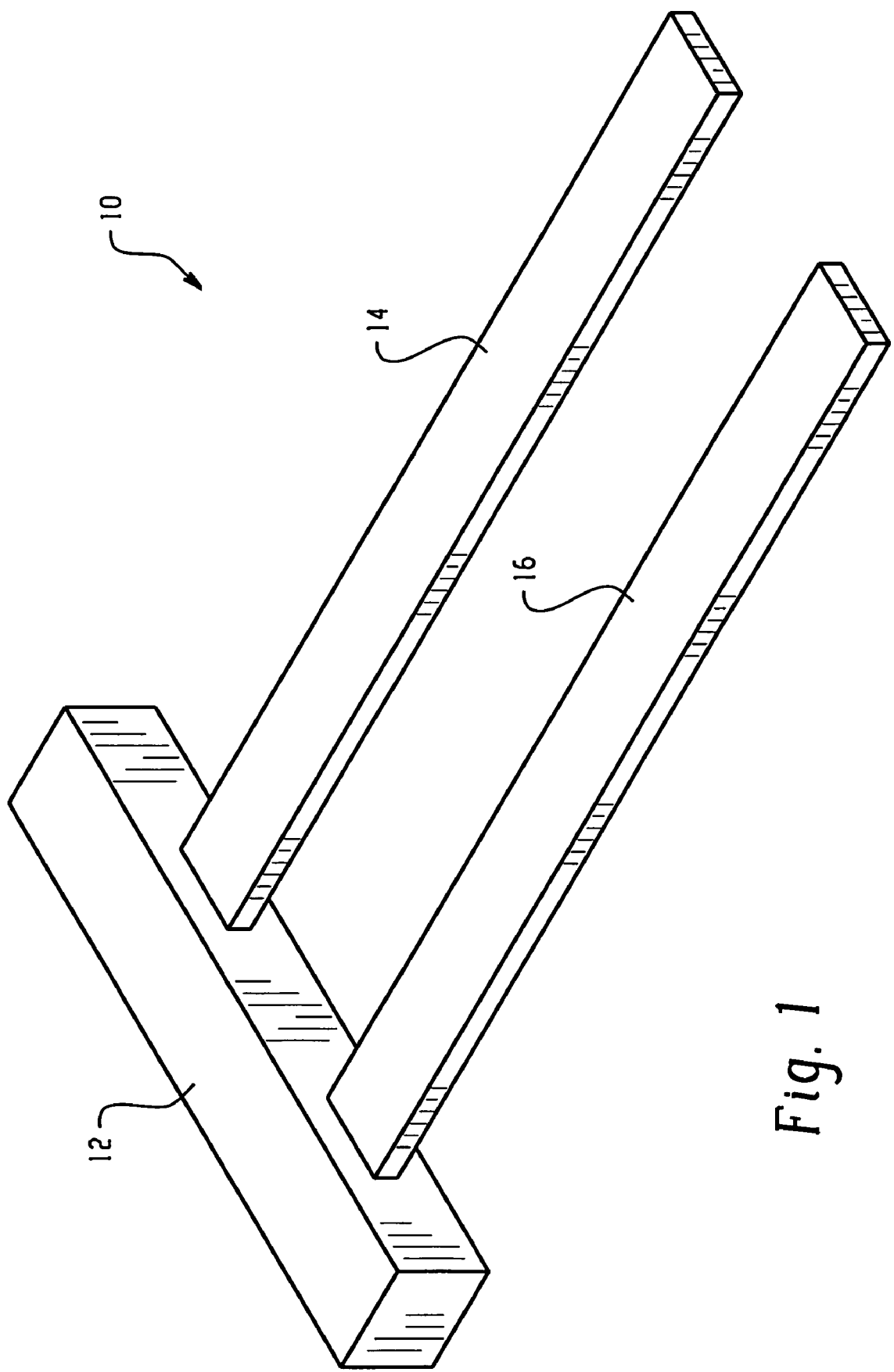
FIG. 1 is a schematic representation of a temperature sensing device according to one embodiment.

Methods and devices for sensing temperature are disclosed herein. In contrast to the prior art, the methods and devices disclosed herein advantageously are based on shape memory polymers (SMPs). As used herein, the term "shape memory polymer" generally refers to a polymeric material, which exhibits a change in a property, such as an elastic modulus, a shape, a dimension, a shape orientation, or a combination comprising at least one of the foregoing properties upon application of a thermal activation signal.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. Furthermore, all ranges disclosed herein are inclusive of the endpoints and independently combinable.

Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be shaped. A permanent shape for the SMP can be set or memorized by subsequently cooling the SMP below that temperature. As used herein, the terms "original shape", "previously defined shape", and "permanent shape" are synonymous and are intended to be used interchangeably. Additionally, if desired, a temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments, it is possible to demonstrate multiple temporary shapes; and with multiple hard segments it may be possible to demonstrate multiple permanent shapes. Similarly using a layered or composite approach, a combination of multiple SMPs will demonstrate transitions between multiple temporary and permanent shapes.

For SMPs with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature with the load removed. Repeating the heating, shaping, and cooling steps can repeatedly reset the temporary shape.

Most SMPs exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent from the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that, it is possible to configure SMPs in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 40° C. Another temperature for shape recovery may be greater than or equal to about 100° C. Another temperature for shape recovery may be less than or equal to about 250° C. Yet another temperature for shape recovery may be less than or equal to about 200° C. Finally, another temperature for shape recovery may be less than or equal to about 150° C.

In one embodiment, the temperature sensing device is a strip comprising a shape memory polymer that has a selected thermal transition temperature at which it undergoes an observable change in its modulus of elasticity. This selected thermal transition temperature is generally the first transition temperature of the SMP. In this manner, the temperature sensing device can be used to determine if the temperature of an item to which it has been contacted is above or below the selected thermal transition temperature. As used herein, the term "strip" is meant to encompass any three-dimensional shape that is not equally and identically symmetrical in all directions (i.e., not a cube or sphere).

Alternatively, the temperature sensing device comprises two or more strips, wherein each strip comprises a shape memory polymer with a unique thermal transition temperature at which it undergoes an observable change in its modulus of elasticity. In this manner, greater accuracy of the temperature of an item can be obtained because a range of temperatures will be defined by the thermal transition temperatures of any two strips. Thus, by contacting the more than one strip to the item, it will be possible to determine if the temperature of that item is above, within; or below the range of temperatures defined by the thermal transition temperatures of any two strips.

For example, FIG. 1 illustrates an exemplary temperature sensing device 10 comprising two strips 14, 16. The strips 14, 16 may each have one end engaged with a holder 12, or may be used in combination without any means of being held together. One strip 14 will have a first thermal transition temperature and the other strip 16 will have a second thermal transition temperature, wherein the first and second thermal transition temperatures are not the same and wherein, for convenience, the first thermal transition temperature is below the second thermal transition temperature. The temperature sensing device 10 may then contact an item 11, whose temperature is to be ascertained, for a sufficient time to allow the temperature sensing device to thermally equilibrate with the contacted item 11. This generally occurs in less than about 5 seconds, and in some embodiments less than about 1 second. If neither strip 14, 16 undergoes an observable decrease in stiffness and/or increase in flexibility, then the temperature of the item is said to be below the first thermal transition temperature. If both strips 14, 16 undergo an observable decrease in stiffness and/or increase in flexibility, then the temperature of the item is said to be above the second thermal transition temperature. However, if only one strip 14 undergoes an observable decrease in stiffness and/or increase in flexibility, then the temperature of the item is said to be between the first thermal transition temperature and the second thermal transition temperature.

Although the temperature sensing device 10 shown in FIG. 1 has two strips, an infinite number of strips, each having different thermal transition temperatures, can be employed. When more than one strip is used to sense the temperature of an item, it may be desirable to inform the user of the device of the selected thermal transition temperature for each strip. This can be accomplished by marking each strip with its thermal transition temperature, as shown in the temperature sensing device 10 of FIG. 2. Other methods of informing the user of the device of the selected thermal transition temperature for each strip include labeling the holder 12 with the thermal transition temperature of each strip, color coding each strip and providing a legend either on the holder or separately, and the like.

The decrease in stiffness and/or increase in flexibility, which is due to the decrease in the modulus of elasticity of the SMP, can be evidenced variously by a change in shape, such as a sagging of the strip under the action of gravity, flapping of the strip when wiggled, or by the strip being bent or deformed when tactilely loaded. This decrease in stiffness and/or increase in flexibility is generally considered to be readily recognizable and is clearly visible. If a strip undergoes the decrease in stiffness and/or increase in flexibility, the contacting of the strip with the item is considered to be the application of the activation signal. Thus if a strip does not experience a decrease in stiffness and/or increase in flexibility, the SMP of the strip has not been exposed to the activation signal. The activation signal is the heat transfer from the item to the SMP during the contacting.

Figure 2:
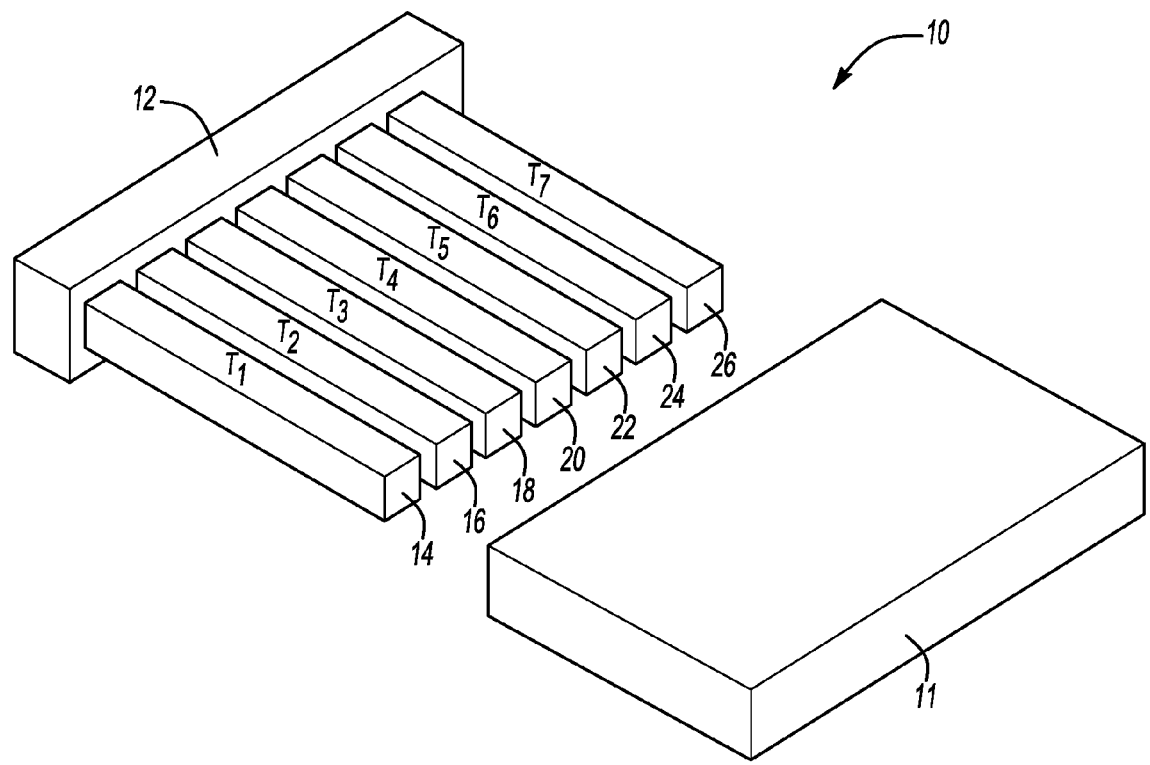
FIG. 2 is a schematic representation of the temperature sensing device according to another embodiment before and after a temperature measurement.
Figure 2:
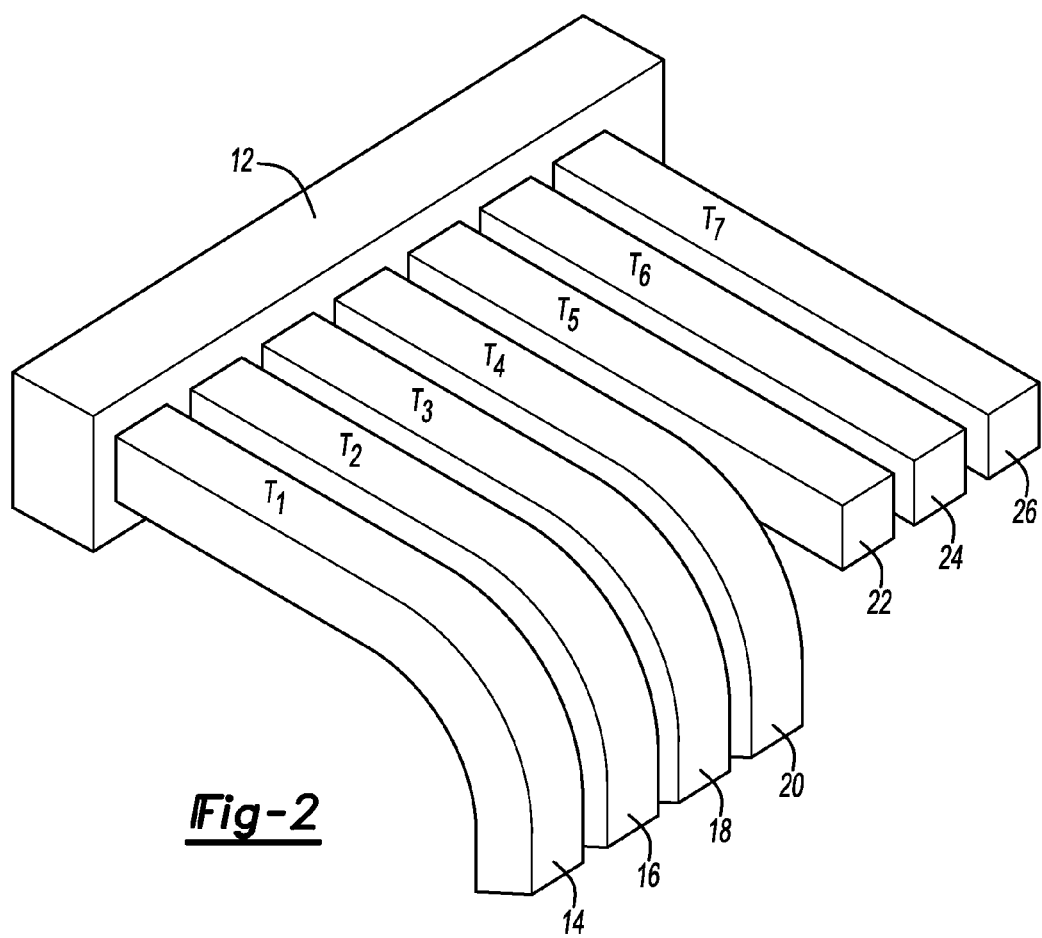

FIG. 2 illustrates an exemplary multi-strip containing temperature sensing device 10 both before and after a temperature measurement. The temperature sensing device 10 in this embodiment comprises 7 strips 14, 16, 18, 20, 22, 24, 26 (14-26) each with one end engaged with the holder 12. The strips 14-26 are each individually labeled to indicate their thermal transition temperatures, which for simplicity have been labeled in FIG. 2 as $T_1$-$T_7$, respectively.

In operation, the temperature sensing device 10 is contacted to and/or immersed in the item (not shown). If the item is at a temperature above the thermal transition temperature of any of the strips 14-26, then those strips 14, 16, 18, 20 undergo a decrease in stiffness and/or increase in flexibility. In one embodiment, whether a strip has experienced a decrease in stiffness and/or increase in flexibility can be gauged by positioning the temperature sensitive device 10 horizontally and allowing those strips 14, 16, 18, 20 whose thermal transition temperature has been exceeded during the contacting to sag or collapse under gravity. In this case, the temperature of the item that was contacted falls between the thermal transition temperatures of strip 20 and strip 22 (i.e., between $T_4$ and $T_5$). In another embodiment, the temperature sensing device 10 may be in operative communication with a sensor (not shown) for sensing a decrease in stiffness and/or increase in flexibility and therefore provide to the user a visual signal indicative of the temperature range, such as with a display.

If the strips of the temperature sensing device are formed using one-way shape memory polymers, then those strips that have experienced a decrease in stiffness and/or increase in flexibility can be returned to their original shape by positioning the temperature sensitive device vertically and applying an activation signal. The force of gravity will facilitate the return of these strips to their original shape. In this manner, the temperature sensitive device can be repeatedly reused. It is important to note that the temperature sensitive device will retain its functionality and is fully operative whether or the strips have been returned to their original shape. Each strip, independent of any alteration in its geometry, can still undergo a decrease in stiffness and/or increase in flexibility when heated above its thermal transition temperature.

If the strips of the temperature sensing device are formed using two-way shape memory polymers, then those strips that have experienced a decrease in stiffness and/or increase in flexibility will return to their original shape upon discontinuation of the activation signal if there is no load or stress applied to the SMP of the strip. Discontinuation of the activation signal comprises the SMPs attaining a temperature below the thermal transition temperature that was attained during the temperature measurement (i.e., contacting and/or immersing).

In devices with more than one strip, if the thermal transition temperatures of the individual strips encompass a broad enough range of temperatures, the same temperature sensing device can be used for numerous applications. Alternatively, if the thermal transition temperatures of the individual strips encompass a narrow range of temperatures, greater temperature range discrimination (i.e., greater precision in determining the temperature of the item) can be achieved.

In one embodiment, the temperature sensing device may be used to determine whether an edible item (e.g., a beverage, soup, solid food, and the like), is of a temperature suitable for consumption. The temperature sensing device can be immersed in the edible item (e.g., tea, coffee, soup, baby formula, and the like), or can touch a surface of the edible item (e.g., meat removed from a barbecue grill, a microwave-cooked meal, baked good, heated baby food, and the like). Once the temperature sensing device has equilibrated with the edible item, it can be removed and any strip can be observed for a decrease in stiffness and/or increase in flexibility. The temperature range of the edible item can be determined as discussed above. If the temperature of the edible item is in a suitable range, then the item may be consumed. If the temperature of the edible item is too high, then the item should be allowed to cool until it attains a more suitable temperature. In this manner, the temperature sensing device aids in the prevention of scalding. Alternatively, if the temperature of the edible item is too low, it may be elevated by heating until it attains a more suitable temperature. The extent to which the edible item must be cooled or heated can be estimated by observing how many other strips (if applicable) have experienced a decrease in stiffness and/or increase in flexibility and, if so, by comparing the thermal transition temperature(s) of the other strips to the suitable temperature.

Similarly, in another embodiment, the temperature sensing device is a single strip used as a stirrer to determine if a hot beverage (e.g., coffee, tea, and the like) or other hot liquid is too hot. In this manner, by undergoing a decrease in stiffness and/or increase in flexibility, the stirrer would indicate that the hot beverage or other hot liquid were fit for use. Alternatively, the temperature sensing device is a single strip used as a stirrer to determine if a beverage, or other liquid is too cold. In this manner, by undergoing an increase in stiffness and/or decrease in flexibility, the stirrer would indicate that the beverage or other liquid were fit for use.

In another embodiment, the temperature sensing device may be used to determine whether a child's bath water is at a safe and/or desirable temperature. The temperature sensing device can be immersed into the bathtub, allowed to equilibrate with the bath water, removed, and any strip can be observed for a decrease in stiffness and/or increase in flexibility. The temperature range of the bath water can be determined as discussed above. Once the temperature of the bath water is in a suitable range, the child may enter the bath tub. If the temperature of the bath water is too high, then it should be allowed to cool (e.g., by waiting and/or by adding water that is colder than the bath water temperature) until it attains a more suitable temperature. In this manner, the temperature sensing device aids in the prevention of scalding. Alternatively, if the temperature of the bath water is too low, it may be elevated by adding hot water until it attains a more suitable temperature. The extent to which the bath water must be cooled or heated can be estimated by observing how many other strips (if applicable) have experienced a decrease in stiffness and/or increase in flexibility and, if so, by comparing the thermal transition temperature(s) of the other strips to the suitable temperature.

In another embodiment, the temperature sensing device may be used to determine whether a body temperature of a person or animal is normal or safe. For example, a human is considered to have a normal body temperature if the body temperature is between about 97 to about 99.5 degrees Fahrenheit (° F.). The normal body temperature for an animal varies depending on the species. The temperature sensing device may be contacted with the body at any conventional temperature measuring location (e.g., forehead, armpit, mouth, rectum, and the like). Once the temperature sensing device is allowed to equilibrate with the body, it is withdrawn from contact and any strip can be observed for a decrease in stiffness and/or increase in flexibility. The temperature range of the body can be determined as discussed above. If the temperature is outside (i.e., above or below) the normal temperature range, corrective steps to bring the body temperature into the normal range may accordingly be taken.

In addition to being useful for ascertaining the temperature of an item, the temperature sensing devices disclosed herein are useful as fluid (i.e., liquid, solution, suspension, gas, or the like) flow restrictors or regulators in applications wherein temperature is a factor of operation. One such application includes heating, ventilating, and air conditioning (HVAC) systems, such as those found in motor vehicles. The primary purpose of the HVAC system is to provide healthy and comfortable ambient conditions. The temperature sensing device can be used as an airflow controller when it is disposed in a conduit and intersects the path of airflow in an HVAC system. The air is considered to be the item whose temperature range is ascertained.

In one embodiment, a temperature sensing device comprising a single strip may also function as a valve that undergoes a change in shape orientation to allow the flow of air from one side to an opposite side of the strip, when the airflow which contacts the strip attains the thermal transition temperature of the strip's SMP. In this manner airflow from the one side to the opposite side is either on or off depending on the temperature of the air relative to the thermal transition temperature of the strip's SMP.

In another embodiment, a temperature sensing device comprising two or more strips may function to provide staged airflow control, such that the amount of air that flows from the one side of the strips to the opposite side of the strips is dictated by the number, shape and thermal transition temperatures of strips. For example, if the air contacting the one side of each strip is below the thermal transition temperature of all of the strips, then no air will flow to the other side of the strips. As the temperature of the air is increased by the heating portion of the HVAC system, those strips whose SMPs have thermal transition temperatures below the temperature of the air will undergo a decrease in stiffness and/or increase in flexibility to allow the air to flow to the opposite side of those strips. Once the air has attained a temperature above the thermal transition temperature of all of the strips, then all air is allowed to flow to the opposite side of the strips.

If a one-way shape memory polymer is used in the strip(s) of the temperature sensing device fluid flow regulator, then desirably the original position of the strip is vertical or substantially vertical. The strip is positioned as such within the HVAC system so that it can be returned to its original shape by shutting off the airflow and allowing the force of gravity to facilitate the return of the strip to its original shape. Alternatively, if a two-way shape memory polymer is used in the strip(s) of the temperature sensing device fluid flow regulator, then those strips that experience a decrease in stiffness and/or increase in flexibility will return to their original shape upon attaining a temperature below the thermal transition temperature that caused the shape orientation change.

As illustrated by the various embodiments discussed above, the item whose temperature is to be ascertained can be chosen from any phase of matter (i.e., solid, liquid and/or gas). Also as illustrated by the various embodiments discussed above, it is evident that the range of temperatures for which the temperature sensing devices described herein may be useful can vary based on a number of factors. For example, the temperature range of concern when the item is infant food is significantly different than the temperature range of concern when the item is coffee or HVAC system airflow. Still further, the temperature range that is considered suitable may be vastly different among coffee drinkers.

Rather than purchase and/or manufacture a temperature sensing device for each permutation of the myriad applications and temperature ranges, it may be beneficial to have a kit comprising a holder, and a plurality of strips each comprising a shape memory polymer with a different thermal transition temperature. The kit holder allows for releasable engagement of any number of strips and, furthermore, the strips may be chosen based on the specific application for the temperature sensing device. In this manner, the cost of manufacturing is reduced while the versatility of the temperature sensing device is dramatically increased.

Suitable polymers for use in the SMPs include thermoplastics, thermosets, interpenetrating networks, semi-interpenetrating networks, or mixed networks of polymers. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly (ethylene terephthalate), polyethylene/nylon (graft copolymer), polycaprolactones-polyamide (block copolymer), poly (caprolactone) dimethacrylate-n-butyl acrylate, poly (norbornyl-polyhedral oligomeric silsesquioxane), polyvinyl chloride, urethane/butadiene copolymers, polyurethane block copolymers, styrene-butadiene-styrene block copolymers, and the like, and combinations comprising at least one of the foregoing polymer components. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). The polymer(s) used to form the various segments in the SMPs described above are either commercially available or can be synthesized using routine chemistry. Those of skill in the art can readily prepare the polymers using known chemistry and processing techniques without undue experimentation.

Advantageously, the temperature sensing devices described herein provide a reusable means for sensing temperature. In addition to providing reversibility, it should be recognized by those skilled in the art that the SMP-based temperature sensing devices as disclosed herein may be relatively quick responding, versatile, inexpensive to manufacture and use, highly portable, and non-toxic.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A temperature sensing and reading device adapted to indicate a temperature range of an ambient environment or item brought into contact therewith, the device comprising:
    two or more strips, wherein each of the two or more strips comprises a shape memory polymer adapted to undergo a visible and reversible change in a modulus of elasticity or shape at a separate thermal transition temperature, and includes a numerical identifier presenting the respective thermal transition temperature of said each of the two or more strips.

2. The temperature sensing device of claim 1, wherein the change in the modulus of elasticity of the shape memory polymer of each of the two or more strips results in a change in a stiffness and/or flexibility of each of the two or more strips.

3. The temperature sensing device of claim 1, further comprising a holder, wherein each of the two or more strips is engageable with the holder at one end.

4. The temperature sensing device of claim 3, wherein each of the two or more strips is releasably engageable with the holder at one end.

5. The temperature sensing device of claim 1, wherein said identifier comprises a marking or labelling on each strip with its respective thermal transition temperature.

6. The temperature sensing device of claim 1, wherein the shape memory polymer comprises one of polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinyl chloride, urethane/butadiene copolymers, polyurethane block copolymers, styrene-butadiene-styrene block copolymers, and a combination comprising at least one of the foregoing.

7. A method of determining a temperature range of an item, comprising:
    concurrently contacting two or more strips with the item, wherein each strip comprises a shape memory polymer adapted to undergo a reversible change in a modulus of elasticity at a separate thermal transition temperature;
    equilibrating the two or more strips with the item; and
    determining the range by observing whether any of the two or more strips underwent a decrease in stiffness and/or increase in flexibility caused by the change in the modulus of elasticity of the shape memory polymer.

* * * * *